United States Patent [19]
Huseman

[11] 3,750,779
[45] Aug. 7, 1973

[54] TREAD FRAME AND DETACHABLE DRIVE SPROCKET SUPPORT

[76] Inventor: Francis R. Huseman, 1110 Wood St., Griffith, Ind. 46319

[22] Filed: Nov. 9, 1971

[21] Appl. No.: 197,091

[52] U.S. Cl. .................................. 180/9.62, 305/60
[51] Int. Cl. ............................................ B62d 55/12
[58] Field of Search .......................... 180/9.62, 9.5; 305/10, 29, 31, 32, 22, 44, 57

[56] References Cited
UNITED STATES PATENTS

| | | | |
|---|---|---|---|
| 1,365,430 | 1/1921 | Wickersham | 180/9.5 |
| 1,479,408 | 1/1924 | Davis | 305/44 |
| 1,638,140 | 8/1927 | Best | 305/57 |
| 1,665,302 | 4/1928 | Holcomb | 305/57 |
| 2,242,570 | 5/1941 | Dafoe | 305/32 |
| 2,378,942 | 6/1945 | Norelius | 305/31 |
| 2,959,451 | 11/1960 | Weber | 305/10 |
| 3,190,384 | 6/1965 | Dufresne | 180/9.5 |

Primary Examiner—Richard J. Johnson
Assistant Examiner—Reinhard Eisenzopf
Attorney—Carlton Hill, J. Arthur Gross et al.

[57] ABSTRACT

Detachable bearing carrier for the drive sprocket of a track type excavator accommodating replacement of the drive sprocket seals and bearings by removal of the sprocket by axial pulling movement thereon. The bearing carrier forms an extension of the tread frame for the continuous traction tread device of the excavator, and is detachably mounted thereon to be readily removed from the frame and end of the drive sprocket, to enable the drive sprocket to be pulled off, without jacking up the tread frame.

8 Claims, 4 Drawing Figures

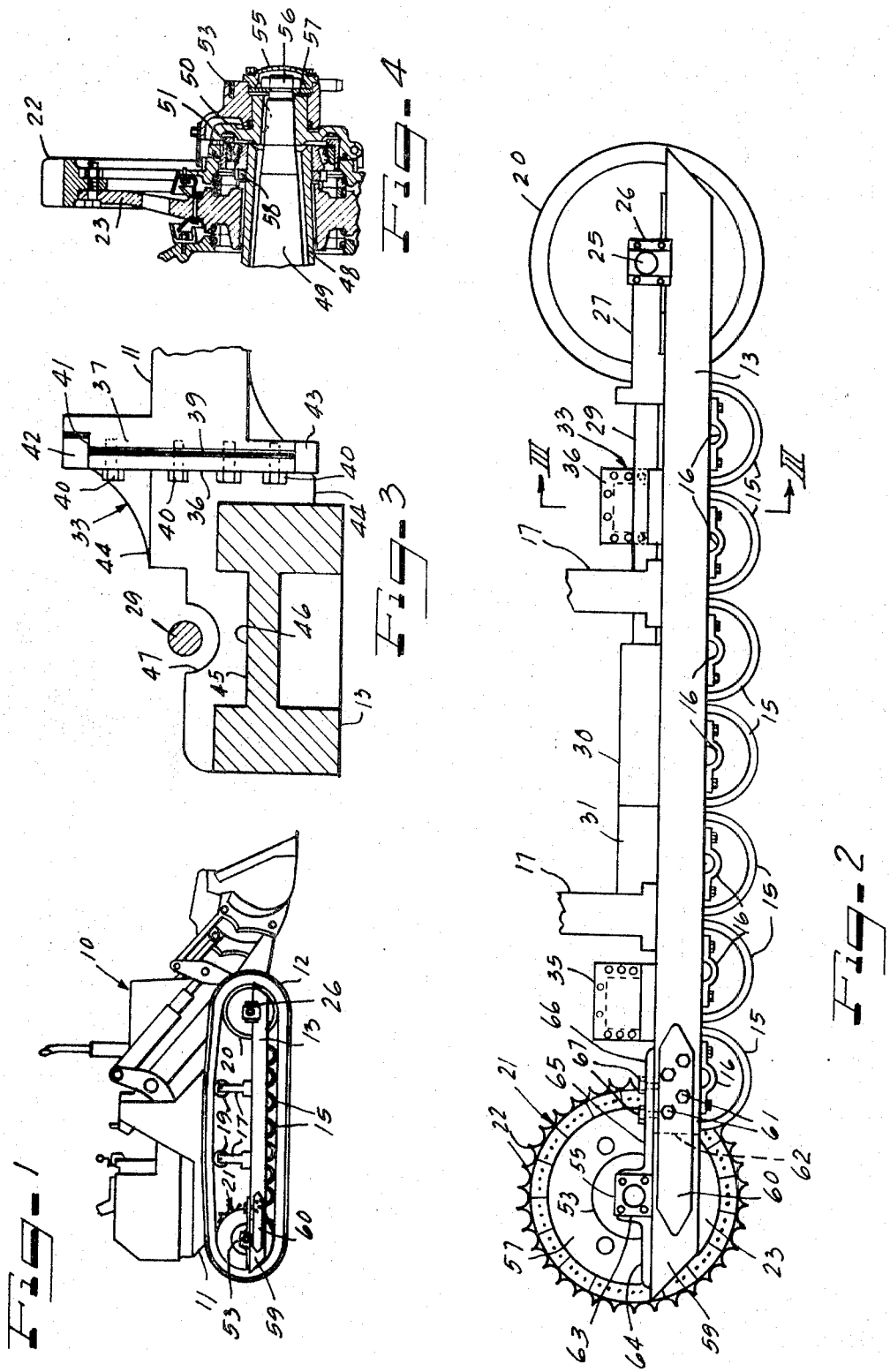

3,750,779

TREAD FRAME AND DETACHABLE DRIVE SPROCKET SUPPORT

FIELD OF THE INVENTION

Detachable support for drive sprocket for continuous traction tread device affording access to the sprocket from its end.

BACKGROUND, SUMMARY AND ADVANTAGES OF THE INVENTION

In continuous traction tread types of tractors and excavators, where it is desired to replace the seals for the drive sprockets or the bearings, or to remove the sprocket, it has been necessary to jack up the tractor to elevate the tread frame and continuous traction tread device above the ground, disconnect the tread devices and then remove the drive sprocket from the rear of the tread frame or else remove the entire tread frame and then pull the sprocket from its drive sleeve. This is a complicated and time-consuming operation, and since the tractor is jacked up on blocks which frequently are unstable, there is always the liability of knocking the tractor off its blocks, both damaging the tractor and many times seriously injuring the person or persons attempting to repair the tractor.

In accordance with the principles of the present invention, the rear drive sprocket may be removed from the end of the tread frame by the simple operation of removing the carrier for the bearing for the drive sprocket from the tread frame, and leaving the area about the sprocket relatively free to accommodate the sprocket to readily be pulled from the tread frame.

The advantages of the present invention, therefore, are in the supporting of the bearing carrier for the drive sprocket of a continuous traction tread device, to form adequate support for the drive sprocket and to be readily removed from the tread frame to free the area in fron of the drive sprocket.

Another advantage is in so constructing the tread frame and its supporting connection to the main frame of the tractor, as to free the tread frame from the liability of collecting dirt and the like about the slack adjustment connection for the idler, frequently causing binding between the adjustment connection for the idler for the tread device.

The principal object of the invention, therefore, is to provide a more accessible tread frame for continuous traction tread devices than has heretofore been provided, arranged with a view toward utmost simplicity in removing the drive sprocket and its bearings and seals from the tread frame, and to avoid any tendency for dirt to bind the take-up for the idler for the traction tread device.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a view in side elevation of a track type excavator utilizing a tread frame constructed in accordance with the principles of the present invention.

FIG. 2 is an enlarged view in side elevation of the tread frame, with the continuous traction tread device removed, and certain other parts shown in a generally diagrammatic form.

FIG. 3 is a transverse sectional view taken substantially along line III—III of FIG. 2; and FIG. 4 is a fragmentary vertical sectional view taken through the drive sprocket for a continuous traction tread device.

DESCRIPTION OF PREFERRED EMBODIMENT OF INVENTION

In FIG. 1 of the drawings, I have shown an excavator 10 of a well-known commercial form, including a main frame 11 supported on continuous traction tread devices 12 extending along each side of said main frame. The traction tread devices 12 are each of an interengaging link-type of tread device in which the treads are transversely pivotally connected together and have interleaving engagement with each other, such as are commonly used on "Caterpillar" and other types of tractors. The continuous traction tread devices and drive and support means therefor are the same for each side of the tread frame, so the drive and support means for one side of the frame only need herein be shown and described.

The tread devices 12 are trained and driven about tread frames 13 extending along and supporting each side of the main frame 11 of the machine. Each tread frame has a plurality of longitudinally spaced tread rollers 15, supporting the tread frame on its continuous tread device and journalled for free rotation about axes extending transversely of said tread frame in bearing boxes 16, bolted or otherwise secured to said tread frame and depending therefrom.

Pedestals 17 are mounted on the top surface of the tread frame 13 and extend upwardly therefrom and form bearing supports for idler rollers 19 supporting the slack side of the tread device and preventing sagging thereof. As herein shown, the pedestals 17 and idlers 19 are spaced substantial distances apart and inwardly of a front idler 20, forming a direction changing member for the tread device at the forward end of the tread frame, and of a drive sprocket 21, forming a drive member for the tread device. The drive sprocket 21 is shown as having removable sprocket teeth 22, meshing with the treads of the tread device and bolted or otherwise secured to a disk 23, driven from the tractor engine (not shown) in a conventional manner.

The front idler 20 is mounted on a transverse shaft 25 trunnioned on opposite sides of said idler in suitable bearings (not shown) carried by bearing supports 26, slidably guided along the top side of the frame 13 and retained from tipping movement with respect to said frame in a manner well-known to those skilled in the art, so not herein shown or described further. It should here be understood that the front part of the frame 13 is forked to accommodate movement of the idler between the bifurcations of the forked portion of said frame, and to accommodate adjustable movement of said idler along said frame. Such a construction is conventional so need not herein be shown or described further. The bearing supports 26 are adjustably carried on the ends of the furcations of a yoke 27, having a take-up rod 29 connected with the base thereof, and extending therefrom along the tread frame 13. The take-up rod 29 extends from a compression spring 30 preloaded by a loading cylinder and piston 31. The loading cylinder and piston 31, spring 30 and take-up rod 29 are parts of a conventional fluid pressure take-up commonly used to maintain the continuous tread device under the proper tension, and to adjustably move the idler 20 along the tread frame 13 and hold said idler in position at the required tension of the continuous traction tread device. The take-up, therefore, need only be diagrammatically shown herein and need not be described in detail.

A front support 33 is provided for mounting the forward end portion of the main frame 11 on the tread frame 13 to be supported thereby. A similar rear support 35 is also provided to connect and support the rear end portion of the main frame 11 on the tread frame 13.

The front support includes a body portion 44 extending over and having an inner generally rectangular flanged portion 36, abutting an enlarged generally rectangular mounting portion 37 of the main frame 11. Shims 39 space the flange 36 from the support portion 37 and may be arranged to provide the required spacing of the tread frame from the side of the main frame. A plurality of machine or cap screws 40 are provided to retain the flange 36 to the mounting portion 37. The mounting portion 37 has a top outwardly and upwardly facing recessed shouldered portion 41, along which fits a block 42 extending along the top of the flange 36 and welded to said recessed shouldered portion 41. A similar block 43 extends along the bottom of the support portion 37 and the rectangular flange 36, and is welded or otherwise secured to said support portion 37 to cooperate with the block 42 and relieve the cap screws 40 from shearing stresses.

The body portion 44 extends outwardly of the flanged portion 36 over the tread frame and downwardly along the inner wall of the tread frame 13, and also has a central depending portion 45 extending within a channel 46 formed in the tread frame. The body portion 44 thus fits along the top and inner wall of the tread frame 13, and generally conforms to the form thereof, and is welded or otherwise secured thereto. The portion of the body portion 44 extending into the recessed portion 46 has an upwardly facing recess 47, shown as being generally semi-circular in form and registering with the take-up rod 29, and forming a recess therefor. The rear support 35 supports the main frame on the tread frame in the same manner the support 33 supports the main frame on the tread frame and is similar to the front support, except the rear support does not have the semi-circular central recess 47, since there is no take-up rod at the rear end portion of the tread frame.

With the support structure just described, the removal of the tread frame from the main frame is simplified and the take-up rod 29 is free as it extends along the support, and the recess 47 opening to the top makes it possible to keep the region along the rod 29 clean and avoids misalignment of the take-up rod and yoke and binding thereof caused by dirt and formerly present with prior types of supports which extend over the take-up rod, which have heretofore been a source of trouble in the slack take-ups for the tension idlers commonly in use.

The disk 23 forming a mounting for the detachable sprocket tooth segments 22 is splined or otherwise secured to an elongated hub or sleeve 48 of a drive gear (not shown) for the sprocket (FIG. 4). The drive gear and hub are coaxial with a transverse shaft 49 forming a dead shaft and held from rotation. The shaft 49 extends beyond the sleeve 48 and has a bearing cap 50 keyed or otherwise secured thereto, forming a support for a front bearing 51 for the drive sprocket.

The bearing cap 50 is carried in a carrier member 53 extending thereabout and closed by an end cap 55 covering a nut 56, threaded on the end of the shaft 49. The nut 56 is seated on a washer 57, seated on the carrier member 53 and serves to take up play in the bearings for the sleeve or hub 48. A nut 58, threaded on the hub 48 is interposed between the bearing 51 and disk 23. The usual seals are carried by the bearing cap 50 and carrier member 53. The construction thus described is conventional.

Referring now in particular to the removable support for the carrier member 53 and bearing cap 50, affording access to the seals and bearing 51 and accommodating removal of the sprocket 22 from the end of the shaft 49, an extension frame 59 forms a rear extension of the tread frame 13, and has a front face 62 abutting the rear face of said tread frame and detachably secured to said tread frame. The frame extension 59 has a strap 60 extending along the outer side thereof for a substantial portion of the length thereof and welded or otherwise secured thereto and extending along the outer side of the tread frame 13 at least as fas as the forward extension of the rearwardmost idlers roller 15. Said strap is detachably secured to said tread frame, as by a plurality of cap screws 61, extending therethrough and threaded in the side of the tread frame.

The support member 53 is shown as having an outwardly extending portion 63, disposed between a pair of angle brackets 64 and 65 and suitably secured thereto. Said angle brackets have relatively long horizontal legs welded or otherwise secured to the top of the extension 59 and have vertical legs extending along opposite sides of the outwardly extending portion 63 of the carrier member 53 and suitably secured thereto, to provide a rigid support therefor. The angle bracket 65 has a horizontal leg 66 longer than the horizontal leg of the angle bracket 64, which extends along the top of the tread frame 13 in abutting engagement therewith. Cap screws 67 afford a means for securing the leg 66 of said angle bracket to the top of the tread frame 13.

The shaft 49, sleeve 48 and sprocket 22 are thus supported on the extension of the tread frame, which may readily be removed from the tread frame to afford access to said sprocket.

As for example, when it is desired to remove the sprocket 21 from the sleeve or hub 48 by pulling from said hub, it is merely necessary to first remove the end cap 55 of the carrier 53 and take off the nut 56 and washer 57. The bolts or cap screws 61 and 67 may then be removed and the extension 59 along with the carrier member 53 and its seals may be removed endwise from the end of the sprocket. When this has been done, the tooth segments 22 in alignment with the rearwardmost roller 15 may be removed, and assuming the tread connection has been broken and is off the upper part of the sprocket, with the sprocket in alignment with the portion of the tread laid flat on the ground and the tread frame supported on the rollers 15, the tooth segments in registry with the portion of the tread lying flat on the ground may also be removed. The bearing cap 50 and bearing together with the seals carried by said bearing cap may then be pulled from the end of the shaft 49 and hub 48. The nut 58 may then be removed and the disk 23 may be pulled from the sleeve 48.

In replacing the sprocket it is merely necessary to slip the sprocket and its seals along the end of the hub 48 and secure the sprocket in splined engagement therewith by its retaining nut 58. The bearing 51 and its bearing cage and bearing cap 50 may then be assembled to the hub 48 and shaft 49. The carrier member 53 mounted on the extension 59 and its seals may then be assembled to the end cap and sealed thereto, and retained to the bearing cap 53 by the washer 57 and nut 56 threaded on the end of the shaft. The extension 59 may then be fastened to the tread frame by the cap screws 61 and 67. When this has been done, end play may be adjusted by the nut 56 in a conventional manner. The end cap 55 may then be replaced.

This provides a simple and effective support for the drive sprocket for a continuous traction tread device, saving a material amount of time and expense when it is desired to take off the sprocket or change the seals or bearing for the sprocket.

I claim as my invention:

1. In a traction tread device and in combination with a tractor having a main frame,
   a tread frame extending along each side of said main frame and secured thereto,
   each tread frame having a continuous traction tread device trained thereabout,
   a drive sprocket at one end of said tread frame meshing with said continuous traction tread device,
   an idler sprocket at the opposite end of said tread frame forming a direction changing device and tensioning means for said tread device,
   tread rollers spaced along said tread frame and supporting said tread frame on said tread device,
   a shaft coaxial with said sprocket,
   a support for the end of said shaft and a bearing support for said drive sprocket, forming a rear extension of said tread frame and extending along the outer side of said drive sprocket,
   said extension having abutting engagement with said tread frame and having a carrier member mounted on its top surface and extending upwardly therefrom and forming a bearing for said sprocket and having a portion lapping the outside of said tread frame and extending therealong for a substantial portion of the length thereof and another portion extending along the top of said tread frame,
   and means detachably connecting said extension to said tread frame, to accommodate removal of said drive sprocket from said tread frame by axial pulling movement on said sprocket, without elevating said tread frame above the ground, comprising detachable securing devices securing said lapping portion and said top portion to said tread frame.

2. The tread device of claim 1,
   wherein the detachable securing devices are in the form of cap screws extending through said lapping portion and said top portion and threaded in said tread frame.

3. The tread frame of claim 1,
   wherein the drive sprocket has detachable sprocket teeth a portion of which are behind the rearwardmost of said tread rollers,
   wherein the portion lapping the outside of said tread frame extends along said tread frame at least as far as the forward end portion of the rearwardmost tread roller, and
   wherein removal of said sprocket is attained by removal of said extension, removal of said sprocket teeth in alignment with said tread roller and removal of certain of said sprocket teeth in alignment with the lower run of the continuous treaction tread device, removing the front bearing and bearing support for said sprocket and then pulling said sprocket endwise from its drive member.

4. The tread frame of claim 3, including tension means for said idler having a rod and means acting on said rod effective to adjust the tension of said idler and maintain tension thereon, and a mounting for said tread frame on said main frame including a support recessed in said tread frame and extending thereacross and having an upwardly opening recess therein in alignment with and free from said rod,
   wherein the support has a generally rectangular flanged portion,
   wherein the main frame of the tractor has an outwardly facing face conforming to the form of said flanged portion, and
   wherein machine screws are provided to secure said flanged portion to said main frame, to accommodate said tread frame to form a support therefor.

5. The tread frame of claim 4, including blocks extending along the top and bottom surfaces of said flanged portion and welded to said main frame to take the shearing stresses from said bolts.

6. The tread frame of claim 1, including tension means for said idler including a rod and means acting on said rod effective to adjust the tension of said idler and maintain tension thereon, and a mounting for said tread frame on said main frame including a support recessed in said tread frame and extending thereacross and having an upwardly opening recess in alignment with and free from said rod.

7. The tread frame of claim 6,
   wherein the support has a generally rectangular flanged portion,
   wherein the main frame of the tractor has an outwardly facing face conforming to the form of said flanged portion, and
   wherein machine screws are provided to secure said flanged portion to said main frame, to accommodate said tread frame to form a support therefor.

8. The tread frame of claim 7, including blocks extending along the top and bottom surfaces of said flanged portion and welded to said main frame to take the shearing stresses from said bolts.

* * * * *